US011478979B2

(12) United States Patent
Blair et al.

(10) Patent No.: US 11,478,979 B2
(45) Date of Patent: Oct. 25, 2022

(54) APPARATUS AND METHOD FOR VARIABLE MAGNETIC ALIGNMENT IN FUSED DEPOSITION MODELING (FDM) MAGNETS

(71) Applicant: Xerox Corporation, Norwalk, CT (US)

(72) Inventors: Christopher D. Blair, Webster, NY (US); David C. Irving, Avon, NY (US); Jay L. Schneider, Canandaigua, NY (US)

(73) Assignee: Xerox Corporation, Norwalk, CT (US)

( * ) Notice: Subject to any disclaimer, the term of this patent is extended or adjusted under 35 U.S.C. 154(b) by 251 days.

(21) Appl. No.: 16/210,731

(22) Filed: Dec. 5, 2018

(65) Prior Publication Data
US 2020/0180213 A1  Jun. 11, 2020

(51) Int. Cl.
| | | |
|---|---|---|
| B29C 64/00 | (2017.01) | |
| B29C 64/118 | (2017.01) | |
| B33Y 50/02 | (2015.01) | |
| B33Y 30/00 | (2015.01) | |
| B29C 64/209 | (2017.01) | |
| B33Y 99/00 | (2015.01) | |

(Continued)

(52) U.S. Cl.
CPC ............ *B29C 64/118* (2017.08); *B29C 64/00* (2017.08); *B29C 64/10* (2017.08); *B29C 64/176* (2017.08); *B29C 64/182* (2017.08); *B29C 64/20* (2017.08); *B29C 64/205* (2017.08); *B29C 64/209* (2017.08); *B29C 64/227* (2017.08); *B29C 64/245* (2017.08); *B29C 64/25* (2017.08); *B29C 64/255* (2017.08); *B29C 64/30* (2017.08); *B29C 64/307* (2017.08); *B29C 64/40* (2017.08); *B33Y 10/00* (2014.12); *B33Y 30/00* (2014.12); *B33Y 40/00* (2014.12); *B33Y 40/10* (2020.01); *B33Y 40/20* (2020.01); *B33Y 50/00* (2014.12); *B33Y 50/02* (2014.12); *B33Y 70/00* (2014.12); *B33Y 80/00* (2014.12); *B33Y 99/00* (2014.12)

(58) Field of Classification Search
CPC .............................. B29C 64/118; B33Y 30/00
See application file for complete search history.

(56) References Cited

U.S. PATENT DOCUMENTS 5,633,021 A * 5/1997 Brown .................... B29C 64/40
425/375
6,253,116 B1 * 6/2001 Zhang .................... B33Y 30/00
700/119

(Continued)

OTHER PUBLICATIONS

Kokkinis, D., Schaffner, M. and Studart, A.R., 2015. Multimaterial magnetically assisted 3D printing of composite materials. Nature communications, 6(1), pp. 1-10. (Year: 2015).*

*Primary Examiner* — Nicholas R Krasnow

(57) ABSTRACT

An apparatus and a method for fabricating a magnetic material with variable magnetic alignment are disclosed. For example, the apparatus includes a reservoir storing magnetic particles, a heater coupled to the reservoir to melt the magnetic particles, a nozzle coupled to the reservoir to receive the magnetic particles that are melted, wherein the nozzle includes a rotatable collar that includes at least one magnet, a platform below the nozzle to receive the magnetic particles that are melted that are dispensed by the nozzle, and a controller communicatively coupled to the heater, the nozzle, and the platform to control operation of the heater, the nozzle, the rotatable collar of the nozzle, and the platform.

11 Claims, 4 Drawing Sheets

(51) Int. Cl.

| | | |
|---|---|---|
| *B29C 64/182* | (2017.01) | |
| *B33Y 40/20* | (2020.01) | |
| *B29C 64/40* | (2017.01) | |
| *B33Y 50/00* | (2015.01) | |
| *B29C 64/176* | (2017.01) | |
| *B33Y 40/10* | (2020.01) | |
| *B29C 64/205* | (2017.01) | |
| *B29C 64/255* | (2017.01) | |
| *B33Y 70/00* | (2020.01) | |
| *B33Y 10/00* | (2015.01) | |
| *B29C 64/30* | (2017.01) | |
| *B29C 64/20* | (2017.01) | |
| *B29C 64/245* | (2017.01) | |
| *B29C 64/307* | (2017.01) | |
| *B33Y 40/00* | (2020.01) | |
| *B29C 64/10* | (2017.01) | |
| *B33Y 80/00* | (2015.01) | |
| *B29C 64/227* | (2017.01) | |
| *B29C 64/25* | (2017.01) | |

(56) References Cited

U.S. PATENT DOCUMENTS

| | | | |
|---|---|---|---|
| 10,254,499 B1* | 4/2019 | Cohen | B23K 1/19 |
| 2006/0124272 A1* | 6/2006 | Galpin | B22D 41/62 |
| | | | 164/502 |
| 2017/0021568 A1* | 1/2017 | Sanz | B33Y 10/00 |
| 2019/0314892 A1* | 10/2019 | Eriksson | B22D 41/62 |
| 2020/0188994 A1* | 6/2020 | Rydholm | B22D 11/115 |

* cited by examiner

APPARATUS AND METHOD FOR VARIABLE MAGNETIC ALIGNMENT IN FUSED DEPOSITION MODELING (FDM) MAGNETS

The present disclosure relates generally to three dimensional printers and, more particularly, to an apparatus and method for variable magnetic alignment in fused deposition modeling (FDM) magnets.

BACKGROUND

Printers can be used to print images on a print media. Various different types of printers are available. Some printers use magnetic rollers with variable pole strengths around the circumference of the roller.

The magnetic rollers were previously manufactured using injection molding or extrusion processes. The process may use a ferrite loaded thermoplastic to produce magnetic materials using the injection molding or the extrusion process.

SUMMARY

According to aspects illustrated herein, there are provided an apparatus and a method for fabricating a magnetic material with variable magnetic alignment. One disclosed feature of the embodiments is an apparatus that comprises a reservoir storing magnetic particles, a heater coupled to the reservoir to melt the magnetic particles, a nozzle coupled to the reservoir to receive the magnetic particles that are melted, wherein the nozzle includes a rotatable collar that comprises at least one magnet, a platform below the nozzle to receive the magnetic particles that are melted that are dispensed by the nozzle, and a controller communicatively coupled to the heater, the nozzle, and the platform to control operation of the heater, the nozzle, the rotatable collar of the nozzle, and the platform.

Another disclosed feature of the embodiments is a method for fabricating a magnetic material with variable magnetic alignment. In one embodiment, the method comprises receiving a set of instructions to print the magnetic material, controlling a nozzle over a platform to dispense a melted magnetic particle at a location on the platform in accordance with the set of instructions, controlling a rotatable collar on the nozzle at the location on the platform to align the magnetic material dispensed by the nozzle, and repeating the controlling the nozzle and the controlling the rotatable collar for each location of each layer of the magnetic material until printing of the magnetic material is completed.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for variable magnetic alignment in a fused deposition modeling (FDM) magnet to fabricate magnetic materials. As discussed above, some printers or imaging devices may use magnetic rollers with variable pole strengths. The magnetic rollers were previously fabricated using an injection molding or extrusion process.

In one example, a strong permanent magnet may be embedded in the tooling to align the ferrites while the plastic is still soft. However, in the previous methods, the positioning of the strong permanent magnets is fixed. Thus, fabricating a material with a variable magnetic pole strength was difficult. In one example, the material may be fabricated in a section by section method as the magnets are moved in each section. In another example, the extrusion may be performed section by section as the magnets are moved. In either scenario, the process to generate the material with variable magnetic pole strength may be inefficient and time consuming.

The present disclosure provides a fused deposition modeling (FDM) three dimensional (3D) printer that may have variable magnetic alignment. In one example, a nozzle of the FDM 3D printer may have a rotatable collar. The collar may have portions that are magnetized. Thus, as the nozzle moves over a platform to print a particular part, the collar may be rotated as the nozzle moves to create variable magnetic alignments in the printed part.

Figure 1:
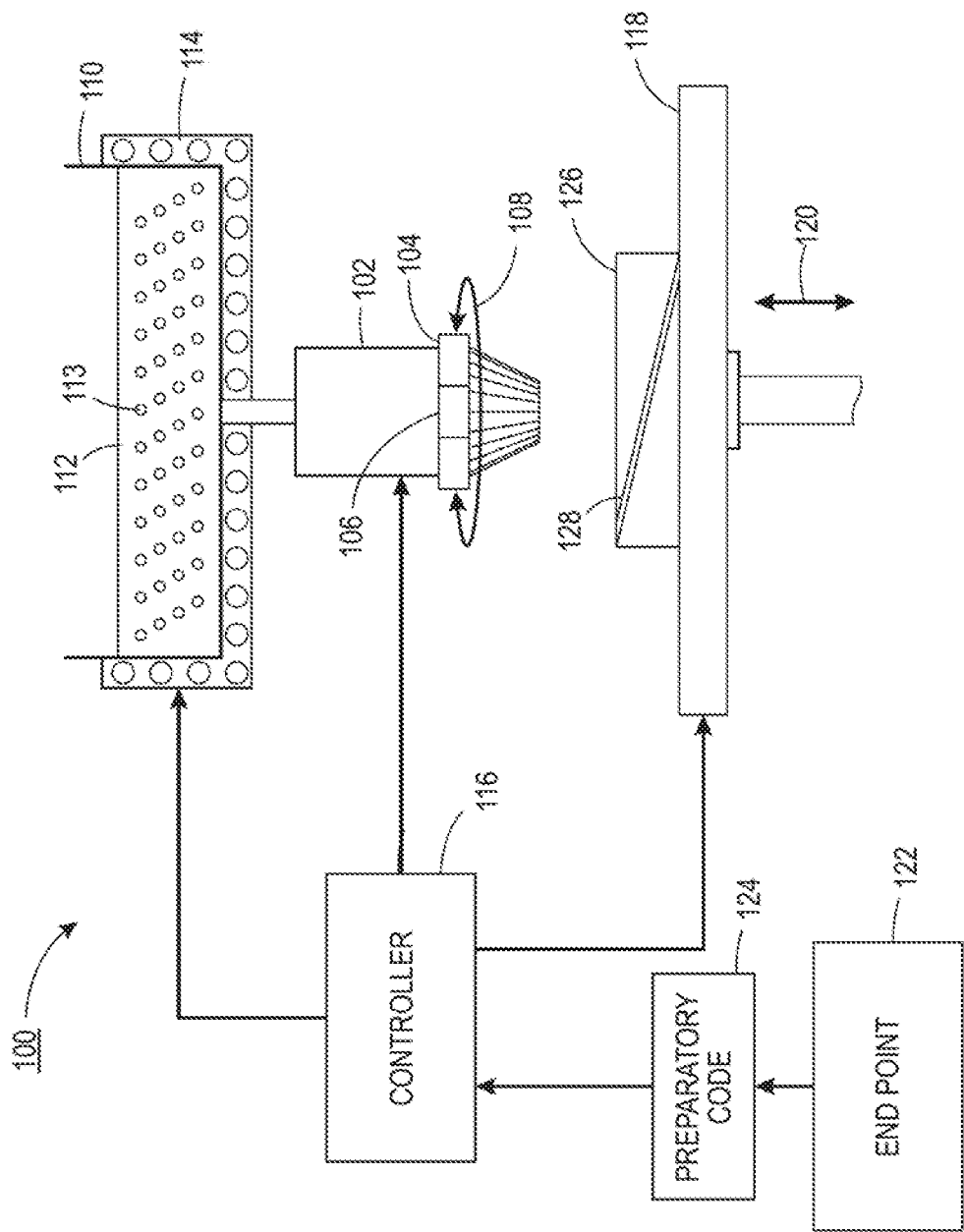
FIG. 1 illustrates an example apparatus of the present disclosure.

FIG. 1 illustrates an example apparatus 100 of the present disclosure. In one example, the apparatus 100 may be an FDM 3D printer. FDM 3D printers may fabricated 3D objects or parts by melting a spool of material. The melted material may be fed through a nozzle and spread on a platform layer by layer to build the 3D object.

In one embodiment, the apparatus 100 may include a nozzle 102. The nozzle 102 may include a collar 104 that includes at least one magnet 106. The collar 104 may be rotatable around the nozzle 102 as shown by an arrow 108.

In one embodiment, a reservoir 110 may be coupled to the nozzle 102. The reservoir 110 may include a plurality of magnetic particles 113. The magnetic particles 113 may be mixed with a plastic 112. The reservoir 110 may include a heater 114 that may include heating elements to heat and melt the plastic 112 and the magnetic particles 113.

The melted mixture of plastic 112 and magnetic particles 113 may be extruded through the nozzle 102 towards a platform 118. The platform 118 may move vertically up and down as shown by an arrow 120. The melted mixture of plastic 112 and magnetic particles 113 may be extruded or dispensed on to the platform 118 to print or fabricate a 3D object 126. The 3D object 126 may be a magnetic material. The platform 118 may be lowered after each layer of the 3D object 126 is printed.

In one embodiment, the 3D object 126 may be a magnetic material having a variable magnetic alignment 128. As shown, the magnetic portion of the 3D object may be variable across a length of the 3D object. The 3D object may be a magnetic roller with the variable magnetic alignment 128, or pole strength, that can be used in a printing device.

In one embodiment, the variable magnetic alignment 128 may be printed by controlling a location of the magnet 106 on the collar 104 as the mixture of the plastic 112 and the magnetic material 113 is extruded through the nozzle 102. As the magnet 106 is rotated around the nozzle 102 via the collar 104, the magnetic material 113 may be moved, or aligned, to a desired side or location within the melted plastic 112. After the plastic 112 is cooled and hardened, the magnetic material 113 may be set in a desired location and/or alignment within the 3D object 126.

In one embodiment, a controller 116 may be coupled to the heater 114, the nozzle 102, the collar 104, and the platform 118. The controller 116 may control operation of the heater 114, the amount of plastic 112 and magnetic material 113 that is dispensed at a particular location on the platform 118, a position of the collar 104 and the magnet 106 in the collar 104, and a position of the platform 118.

In one embodiment, the controller 116 may control operation of the nozzle 102, the collar 104, the heater 114, and the platform 118 in accordance with a preparatory code 124 received from an endpoint device 122. The preparatory code 124 may be G-code or any other type of code protocol used to generate instructions for a FDM 3D printer. However, the code may be modified to include rotational information, as discussed in further details below.

In one example, the endpoint device 122 may be a computer (e.g., a desktop computer, a laptop computer, a tablet computer, and the like) that is communicatively coupled to the controller 116 of the apparatus 100. The endpoint device 122 may be remotely located from the apparatus 100 or located next to the apparatus 100.

In one embodiment, the preparatory code 124 may be generated based on a 3D model generated by the endpoint device 122. The preparatory code 124 may include parameters or information associated with instructions on how to print the 3D object 126. The preparatory code 124 may provide how much of the melted plastic 112 and the melted magnetic material 113 that is to be dispensed at each x, y, and z coordinate of the platform 118.

The preparatory code 124 may include a parameter to define if material should be extruded or retracted in the nozzle 102. For example, at certain locations, the nozzle 102 may be moved without dispensing the melted plastic 112 with the magnetic materials 113.

In one embodiment, the preparatory code 124 may be further modified in the present disclosure to include rotation information. The rotation information may define a position of the collar 104 and/or magnet 106 at a particular x, y, and z coordinate.

In one example, the rotation information may be an absolute number. For example, the collar 104 may be coupled to the nozzle 102 with a home location that is set to be 0 degrees. The collar 104 may rotate from 0-359 degrees around the nozzle 102. The rotation information may define a position at each x, y, and z coordinate. For example, the absolute number may be 45 degrees, 180 degrees, 270 degrees, and the like.

In one embodiment, the rotation information may be an offset value. The offset value may be a value relative to a previous position. For example, the collar may have been at a particular position at a first x, y, and z coordinate. The offset value may indicate +3 at the second x, y, and z coordinate. For example, 3 more degrees.

In another embodiment, the collar 104 may be coupled to the nozzle 102 with incremental positions defined in the coupling. For example, each position may "click" into place as the collar 104 is rotated. Thus, the offset value may define a number of "clicks" from a current position.

In one embodiment, the rotational information may include a combination of an absolute value and an offset value. For example, for each layer, the first x, y, and z coordinate may have an absolute value (e.g., 45 degrees). Each subsequent x, y, and z coordinate may provide an offset value relative to the previous rotation information (e.g., +5) until printing of the layer of the 3D object 126 is completed.

In one example, the plastic 112 may be any type of plastic material that may be melted and extruded through the nozzle 102. The magnetic material 113 may be any type of metal having a magnetic property. In one example, the magnetic material 113 may be a metal that exhibits anisotropic magnetic properties. Anisotropic magnets may be cheaper, but require alignment. The rotatable collar 104 with the magnet 106 may be used to align the anisotropic magnet.

In one example, the magnetic material 113 may be a rare earth metal or a rare earth metal based compound. The magnetic material 113 may be a neodymium iron boron compound.

In one example, the magnetic material 113 may be dispensed into the reservoir 110 as crushed particles. The magnetic material 113 may be dispensed as particles having an average diameter of less than 5 microns. In one example, the magnetic material 113 may be dispensed as particles having an average diameter of approximately 1-2 microns.

Although only a single magnet 106 is illustrated in the collar 104, it should be noted that the collar 104 may include more than one magnet 106. In one example, magnets 106 may be located on opposite sides of the collar 104 to align the magnetic material 113 on two different side of the melted plastic, and the like.

Figure 2:
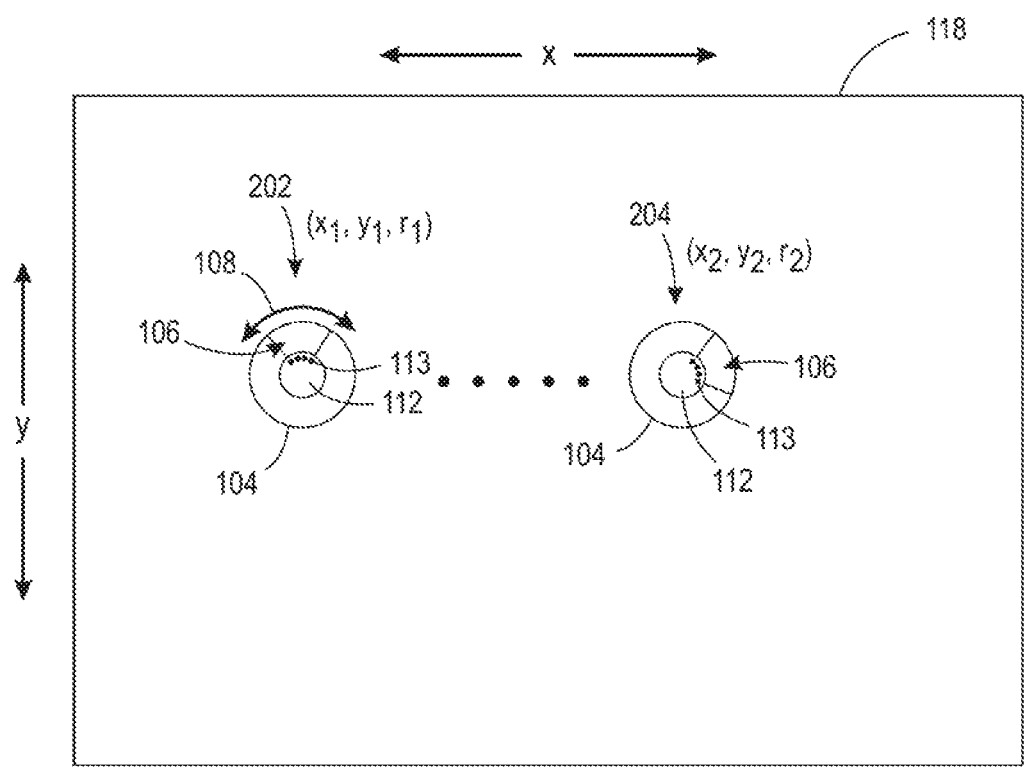
FIG. 2 illustrates an example top view of the apparatus of the present disclosure in operation.

FIG. 2 illustrates a top view of the apparatus 100 of the present disclosure in operation. In one example, the x, y coordinates of the platform 118 may be defined as shown in FIG. 2. As noted above, the controller 116 may control movement of the nozzle 102 along the x, y plane over the platform 118.

In one example, the z coordinates (e.g., movement into and out of the page) may be controlled by the movement of the platform 118. For example, each layer of the 3D object 126 may be at a particular z-coordinate. The platform 118 may be moved to print each layer at a particular z-coordinate.

As noted above, the preparatory code 124 may be modified to include a rotational information "r". At a time 202, the nozzle 102 may be moved to a particular location $(x_1, y_1)$ at a particular z value set by the platform 118. At the time 202, the collar 104 may be rotated to a position $r_1$. As a result, when the melted plastic 112 is extruded through the nozzle 102, the magnetic material 113 may be attracted to a particular position near the magnet 106, as shown in FIG. 2.

After the melted plastic 112 with the melted magnetic material 113 is dispensed or printed at the location $(x_1, y_1)$, the nozzle 102 may be moved to a different location $(x_2, y_2)$ at a later time 204. At the location $(x_2, y_2)$, the collar 104 may be rotated to a position $r_2$ (e.g., around in a direction as shown by the arrow 108). Thus, the magnet 106 may be rotated to a different position around the nozzle 102.

At the location $(x_2, y_2)$ with the collar 104 at the rotational position $r_2$, the melted plastic 112 with the melted magnetic material 113 may be extruded through the nozzle 102. As the mixture of the plastic 112 and the magnetic material 113 is dispensed, the magnetic material 113 may be attracted to a particular location near the magnet 106. Thus, the magnetic material 113 may be aligned at a differently at the location $(x_2, y_2)$ compared to the alignment of the magnetic material 113 at the location $(x_1, y_1)$.

As a result, the apparatus 100 may gradually change the alignment of the magnetic material 113 as the 3D object 126 is being printed. The alignment of the magnetic material 113 may be varied along a continuous length, width, depth, or a combination of length, width, and depth of the 3D object 126.

Figure 3:
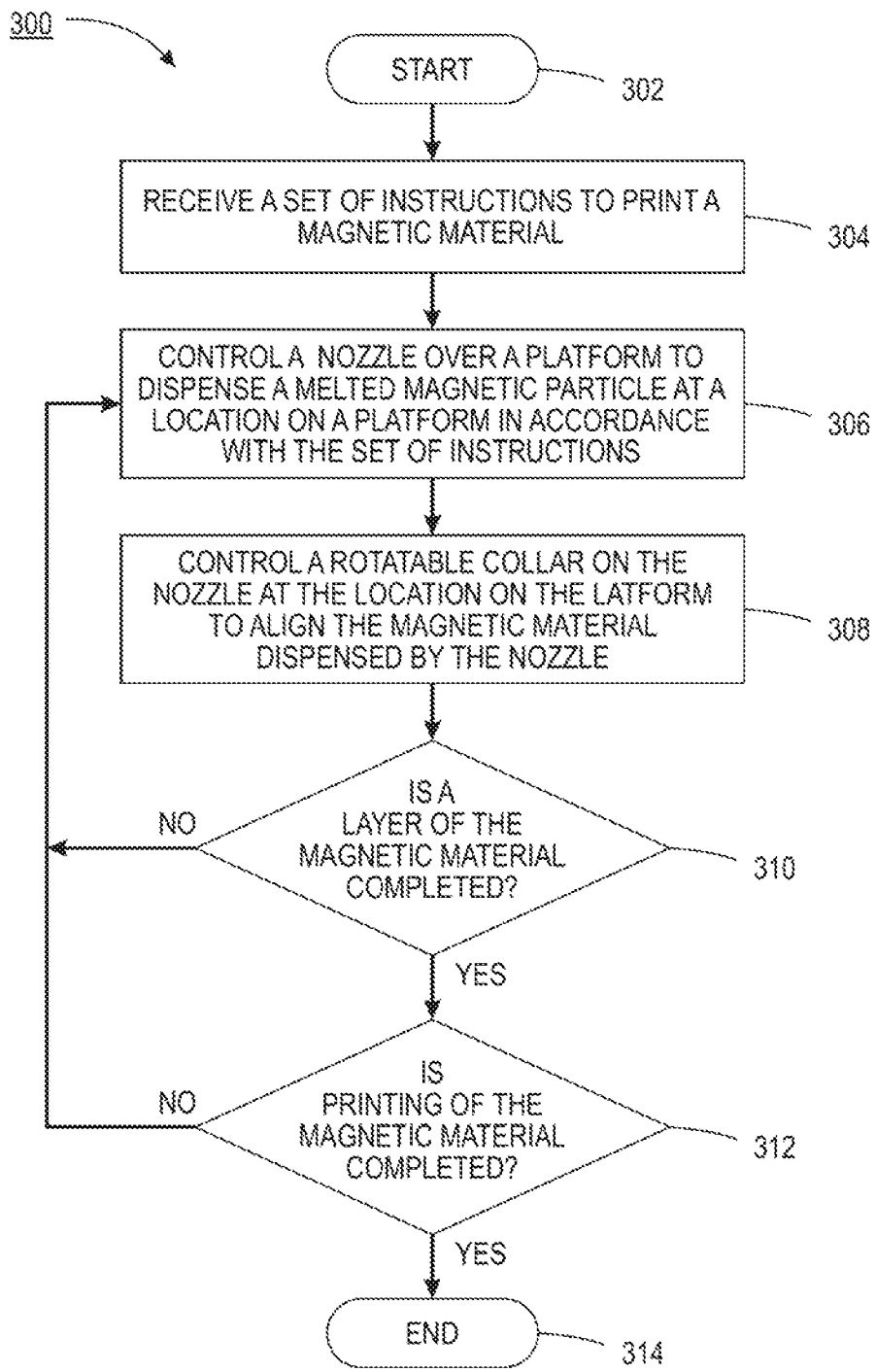
FIG. 3 illustrates a flowchart of an example method for fabricating a magnetic material with variable magnetic alignment.
Figure 4:
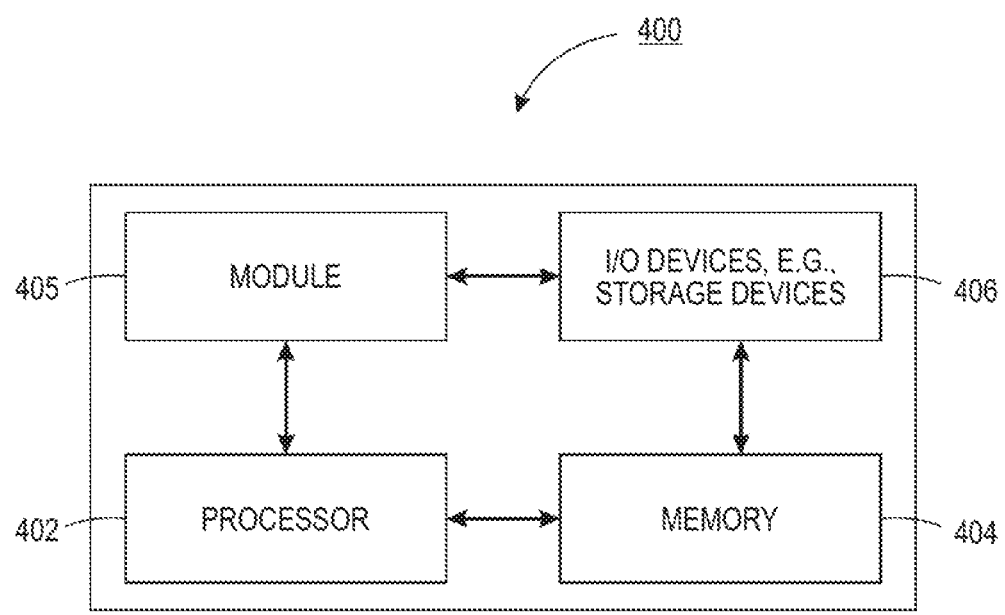
FIG. 4 illustrates a high-level block diagram of a computer suitable for use in performing the functions described herein.

FIG. 3 illustrates a flowchart of an example method 300 for fabricating a magnetic material with variable magnetic alignment. In one embodiment, one or more steps or operations of the method 300 may be performed by the apparatus 100 or a computer that controls the apparatus 100 as illustrated in FIG. 4 and discussed below.

At block 302, the method 300 begins. At block 304, the method 300 receives a set of instructions to print the magnetic material. In one example, the magnetic material may be a 3D object printed by a FDM 3D printer of a processor executing the method 300. The 3D object may have a variable magnetic alignment or variable pole strength (e.g., a magnetic roller used in a printing device).

In one embodiment, the instructions may be preparatory code (e.g., G-code) that can be used to print the magnetic material. The instructions may be generated by a different computer connected to the processor of the FDM 3D printer. As noted above, the set of instructions may include additional parameters such as a parameter to specify extraction or retraction of the material that is dispensed, a rotational information, and the like.

At block 306, the method 300 controls a nozzle over a platform to dispense a melted magnetic particle at a location on the platform in accordance with the set of instructions. In one embodiment, the melted magnetic particle may include a plurality of magnetic particles. The magnetic particles may be melted in a melted plastic.

In one embodiment, the platform may be set to a particular z-coordinate or height to print a layer of the magnetic material. In one embodiment, the nozzle may be moved to a particular x, y coordinate on the platform. Where the nozzle is moved (e.g., to the particular x, y coordinate) may be based on the set of instructions.

At block 308, the method 300 controls a rotatable collar on the nozzle at the location on the platform to align the magnetic material dispensed by the nozzle. In one embodiment, the set of instructions may include rotation information. As noted above, the rotation information may be provided as an absolute value, a relative offset value, or a combination of both.

At block 310, the method 300 determines if the layer of the magnetic material is completed. For example, the movement of the nozzle to different x, y locations and the rotation of the collar to align magnetic particles while being dispensed by the nozzle at a particular x, y location may be repeated until a layer of the magnetic material is completed.

If the layer of the magnetic material is not completed, then the method 300 may return to block 306. Blocks 306 and 308 may be repeated until printing of the layer of the magnetic material is completed. If the layer is completed, the method 300 may proceed to the block 312.

At block 312, the method 300 determines if the printing of the magnetic material is completed. For example, the magnetic material may be printed layer by layer. After each layer is printed, a platform may be lowered to receive the melted magnetic material for the next layer to be printed.

If additional layers need to be printed, the method 300 may return to block 306. The blocks 306, 308, and 310 may be repeated until the entire magnetic material is printed. If printing of the magnetic material is completed, then the method 300 may proceed to block 314. At block 314, the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, blocks or operations in FIG. 3 that recite a determining operation or involve a decision do not necessarily require that both branches of the determining operation be practiced. In other words, one of the branches of the determining operation can be deemed as an optional step. In addition, one or more steps, blocks, functions or operations of the above described method 300 may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

FIG. 4 depicts a high-level block diagram of a computer that is dedicated to perform the functions described herein. As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for fabricating a magnetic material with variable magnetic alignment, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for fabricating a magnetic material with variable magnetic alignment (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for fabricating a magnetic material with variable magnetic alignment (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. An apparatus to fabricate a magnetic material with variable magnetic alignment, comprising;
   a reservoir storing a mixture of plastic and magnetic particles;
   a heater coupled to the reservoir to melt the mixture of plastic and magnetic particles;
   a nozzle coupled to the reservoir to receive the mixture of plastic and magnetic particles that are melted, wherein the nozzle comprises a rotatable collar that includes at least one magnet, wherein the rotatable collar can be rotated 360 degrees around the nozzle to position the at least one magnet at different radial locations to move the magnetic particles as the mixture is dispensed through the nozzle, such that the magnetic particles are at different locations within deposited layers of the mixture;
   a platform below the nozzle to receive the mixture of plastic and magnetic particles that are melted that are dispensed by the nozzle; and
   a controller communicatively coupled to the heater, the nozzle, and the platform to control operation of the heater, the nozzle, the rotatable collar of the nozzle, and the platform, wherein the controller is configured to rotate the rotatable collar to position the at least one magnet at a first rotational position at a first coordinate over the platform while the mixture is dispensed at the first coordinate and to rotate the rotatable collar to position the at least one magnet at a second rotational position at a second coordinate over the platform while the mixture is dispensed at the second coordinate.

2. The apparatus of claim 1, wherein the magnetic property comprises an anisotropic magnet.

3. The apparatus of claim 2, wherein the magnetic particles comprise a rare earth metal or a rare earth metal based compound.

4. The apparatus of claim 3, wherein the rare earth metal comprises a neodymium iron boron compound.

5. The apparatus of claim 4, wherein the neodymium iron boron compound comprises particles that have an average diameter of less than 5 microns.

6. The apparatus of claim 1, wherein the controller controls movement of the nozzle along an x-y plane of the platform.

7. The apparatus of claim 6, wherein the controller controls a rotational position of the rotatable collar at each position of the nozzle in the x-y plane of the platform.

8. The apparatus of claim 7, wherein the rotational position of the rotatable collar is determined based on a variable magnetic alignment profile of the magnetic material.

9. The apparatus of claim 1, wherein the platform moves lower after each layer of the mixture of plastic and magnetic material is printed until printing of the magnetic material is completed.

10. The apparatus of claim 1, wherein the magnetic material comprises a magnetic roller with variable pole strengths for a printing device.

11. An apparatus to fabricate a magnetic material with variable magnetic alignment, comprising;
    a reservoir storing a mixture of neodymium iron boron particles having an average diameter of 1 micron to 2 microns and a plastic;
    a heater coupled to the reservoir to melt the mixture of neodymium iron boron particles and the plastic;
    a nozzle coupled to the reservoir to receive the mixture of neodymium iron boron particles and plastic that are melted, wherein the nozzle comprises a rotatable collar around an extrusion opening that includes a magnet, wherein the rotatable collar rotates 360 degrees around the nozzle to position the magnet at different radial locations to align the neodymium iron boron particles that are within the plastic that is melted as the mixture of neodymium iron boron particles and plastic that are melted are extruded out of the nozzle, such that the neodymium iron boron particles are at different locations within deposited layers of the mixture;
    a platform below the nozzle to receive the mixture of neodymium iron boron particles and plastic that are melted that are dispensed by the nozzle; and
    a controller communicatively coupled to the heater, the nozzle, and the platform to control operation of the heater, the nozzle, the rotatable collar of the nozzle, and the platform to print the magnetic material in accordance with a set of instructions that model include parameters that model the magnetic material and the variable magnetic alignment of the magnetic material, wherein the controller is configured to rotate the rotatable collar to position the magnet at a first rotational position at a first coordinate over the platform while the mixture is dispensed at the first coordinate and to rotate the rotatable collar to position the magnet at a second rotational position at a second coordinate over the platform while the mixture is dispensed at the second coordinate.

* * * * *